(12) United States Patent
Shitamichi et al.

(10) Patent No.: US 9,365,171 B2
(45) Date of Patent: Jun. 14, 2016

(54) GROMMET AND WIRE HARNESS WITH GROMMET

(71) Applicant: SUMITOMO WIRING SYSTEMS, LTD., Mie (JP)

(72) Inventors: Masaru Shitamichi, Mie (JP); Yoshinao Kobayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/406,875

(22) PCT Filed: Nov. 8, 2012

(86) PCT No.: PCT/JP2012/078957
§ 371 (c)(1),
(2) Date: Dec. 10, 2014

(87) PCT Pub. No.: WO2013/186947
PCT Pub. Date: Dec. 19, 2013

(65) Prior Publication Data
US 2015/0129303 A1  May 14, 2015

(30) Foreign Application Priority Data

Jun. 11, 2012  (JP) ................................. 2012-131820

(51) Int. Cl.
*H02G 3/22* (2006.01)
*H02G 3/04* (2006.01)
*B60R 16/02* (2006.01)

(52) U.S. Cl.
CPC .............. *B60R 16/0222* (2013.01); *H02G 3/22* (2013.01)

(58) Field of Classification Search
CPC .................................................. B60R 16/0222

USPC ........................................... 174/152 G, 72 A
See application file for complete search history.

(56) References Cited

U.S. PATENT DOCUMENTS 6,339,196 B1 *  1/2002  Uchida ............... B60R 16/0222
                                                                16/2.1

(Continued)

FOREIGN PATENT DOCUMENTS

| JP | 2004-320951 | 11/2004 |
| JP | 2005-228582 | 8/2005 |
| WO | 2009/096036 | 8/2009 |

OTHER PUBLICATIONS

Search report from PCT/JP2012/078957, mail date is Dec. 4, 2012.

*Primary Examiner* — Sherman Ng
(74) *Attorney, Agent, or Firm* — Greenblum & Bernstein, P.L.C.

(57) ABSTRACT

A grommet includes a wire harness insertion portion, and an annular projecting portion that is made of an elastic material and projects outward from the wire harness insertion portion, the annular projecting portion being provided with an annular locking recess arranged at an outer circumferential portion of the annular projecting portion, a receiving-side annular portion arranged on one side of the annular locking recess, with respect to an axial direction of the wire harness insertion portion, and an insertion-side annular portion arranged on the other side of the annular locking recess, with respect to the axial direction of the wire harness insertion portion. The outer circumferential portion of the insertion-side annular portion on the annular locking recess side is provided with projections that are formed at portions in the circumferential direction of the insertion-side annular portion. The projections are each provided with a slant surface and a panel facing surface.

5 Claims, 6 Drawing Sheets

(56) References Cited

U.S. PATENT DOCUMENTS

| | | | |
|---|---|---|---|
| 6,675,439 B2* | 1/2004 | Hashimoto | B60R 16/0222 16/2.1 |
| 6,897,380 B2* | 5/2005 | Sakata | B60R 16/0222 16/2.1 |
| 2002/0038715 A1* | 4/2002 | Nakata | B60R 16/0222 174/650 |
| 2004/0206538 A1 | 10/2004 | Okuhara | |
| 2011/0011625 A1* | 1/2011 | Okuhara | B60R 16/0222 174/152 G |

* cited by examiner

GROMMET AND WIRE HARNESS WITH GROMMET

TECHNICAL FIELD

The present invention relates to a grommet attached to a wire harness at a portion that passes through a through hole of a vehicle body panel.

BACKGROUND ART

Conventionally, the grommet disclosed in Patent Document 1 has been known as this type of grommet. In the grommet disclosed in Patent Document 1, a large-diameter tubular portion is provided on the outer circumferential surface with a plurality of projecting portions that extend in the axial direction and are spaced apart from each other in the circumferential direction. Each of the projecting portions includes a diameter-enlarging slant portion that extends from a side of a small-diameter tubular portion through a contact point that comes into contact with an inner circumferential surface around a through hole upon inserting the grommet into the through hole to a bending point, the slant portion being slanted in parallel to the outer circumferential surface of the large-diameter tubular portion, and a diameter-reducing slant portion that extends from the bending point to a front end on a vehicle body locking recess side and inclines in the reversed slant direction.

CITATION LIST

Patent Documents

Patent Document 1: WO 2009/096036

SUMMARY OF THE INVENTION

Technical Problem

However, with the technique disclosed in Patent Document 1, it is difficult to determine whether or not the inner circumferential edge portion of the through hole in the vehicle panel is fitted to the vehicle body locking recess.

Therefore, it is an object of the present invention to make it easy to confirm whether or not the inner circumferential edge portion of the through hole in the vehicle panel is fitted to an annular locking recess of a grommet.

Solution to Problem

To solve the foregoing problems, the first aspect is a grommet that is attachable to a through hole formed in a vehicle body panel in a state where the grommet has been attached to a wire harness, the grommet including a wire harness insertion portion having a tubular shape through which the wire harness is insertable, and an annular projecting portion that is made of an elastic material and projects outward from the wire harness insertion portion, the annular projecting portion being provided with an annular locking recess to which an inner circumferential edge portion of the through hole in the vehicle body panel can be fitted, the annular locking recess being arranged at an outer circumferential portion of the annular projecting portion, a receiving-side annular portion arranged on one side of the annular locking recess, with respect to an axial direction of the wire harness insertion portion, and an insertion-side annular portion arranged on the other side of the annular locking recess, with respect to the axial direction of the wire harness insertion portion, wherein the outer circumferential portion of the insertion-side annular portion on the annular locking recess side is provided with projections that are formed at portions in the circumferential direction of the insertion-side annular portion, the projections are each provided with a slant surface that inclines outward as it extends toward the annular locking recess in the axial direction of the wire harness insertion portion and a panel facing surface that defines an acute angle together with the slant surface and faces the annular locking recess and an inner circumferential portion of the insertion-side annular portion is provided with a recess that is recessed toward the outer circumferential portion of the insertion side annular portion and reduces the thickness of a portion of the projections that is located on the other side of the panel facing surface, with respect to the axial direction of the wire harness insertion portion.

The second aspect is the grommet according to the first aspect, wherein the insertion-side annular portion is formed in a shape in which a plurality of annular projections that successively become larger toward the annular locking recess are connected to each other via an annular recess, and the projections are each formed on an outer circumference of the insertion-side annular portion in a shape of an elongate projection that extends in the axial direction of the wire harness insertion portion while filling the annular recess.

The third aspect is the grommet according to the first aspect or the second aspect, wherein a portion of the projection that extends from a portion that comes into contact with the through hole when the insertion-side annular portion is inserted into the through hole to a portion in which the slant surface reaches the panel facing surface inclines at a uniform angle with respect to the axial direction of the wire harness insertion portion.

The fourth aspect is the grommet according to any one of the first to third aspects, wherein the projection projects in a rectangular shape from the insertion-side annular portion as viewed in the axial direction of the wire harness insertion portion.

The fifth aspect is the grommet according to any one of the first to fourth aspects, wherein at least three projections are provided at intervals around the insertion-side annular portion.

A wire harness with a grommet according to the sixth aspect includes a wire harness to be arranged to pass through a through hole formed in a panel and the grommet according to any one of the first to fifth aspects that is attached to the wire harness.

Advantageous Effects of the Invention

With the first to fifth aspects, when the insertion-side annular portion is inserted into the through hole to fit the inner circumferential edge portion of the through hole of the vehicle body panel to the annular locking recess, the slant surfaces of the projections come into contact with the inner circumferential edge portion of the through hole, and when the slant surfaces pass over the inner circumferential edge portion of the through hole, the projections snap back to their original shape. Since a sound is likely to be made when the projections snap back to their original shape and it is possible to feel an insertion feeling when the grommet is inserted into the through hole, it is easy to confirm whether or not the inner circumferential edge portion of the through hole of the vehicle body panel is fitted to the annular locking recess of the grommet.

With the second aspect, the insertion-side annular portion is formed in a shape in which a plurality of annular projections that successively become larger toward the annular locking recess are connected to each other via an annular recess, and therefore the insertion-side annular portion can be bent to some extent with respect to the vehicle body panel. Thereby, it is possible to enhance a degree of freedom of the direction in which the wire harness is drawn. Moreover, the projections are each formed on the outer circumference of the insertion-side annular portion in a shape of an elongate projection that extends in the axial direction of the wire harness insertion portion while filling the annular recess, and therefore, when the grommet is inserted into the through hole, the projections can reinforce the insertion-side annular portion and enhance the insertion property.

With the third aspect, when each diameter of the grommet is inserted into the through hole, the projections come into contact with the inner circumferential edge portion in a substantially uniform manner, and therefore, it is possible to stabilize the insertion feeling.

With the fourth aspect, the projections project in a rectangular shape from the insertion-side annular portion as viewed in the axial direction of the wire harness insertion portion, and therefore, a larger sound is likely to be made when the projections snap back to their original shape, and it is possible to feel the great insertion feeling. Thereby, it is possible to more easily confirm whether or not the inner circumferential edge portion of the through hole of the vehicle body panel is fitted to the annular locking recess of the grommet.

With the fifth aspect, it is easy to confirm whether or not the entire inner circumferential edge portion of the through hole of the vehicle body panel is fitted to the annular locking recess.

DESCRIPTION OF EMBODIMENTS

Figure 1:
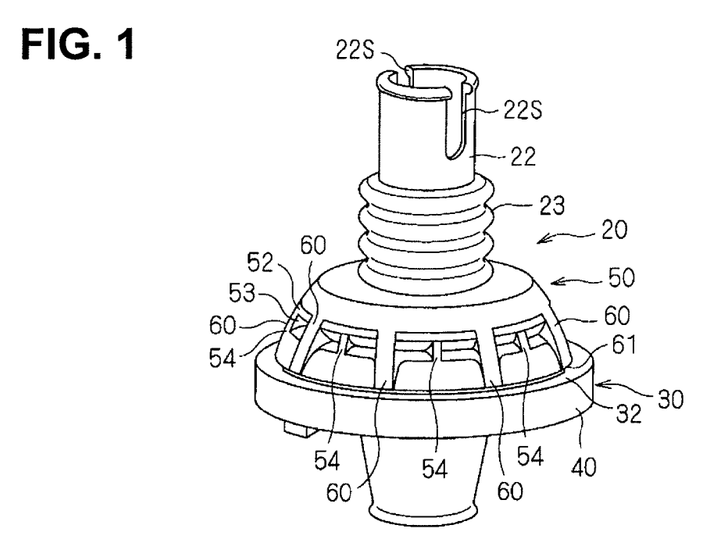
FIG. 1 is a perspective view of a grommet according to an embodiment.
Figure 2:
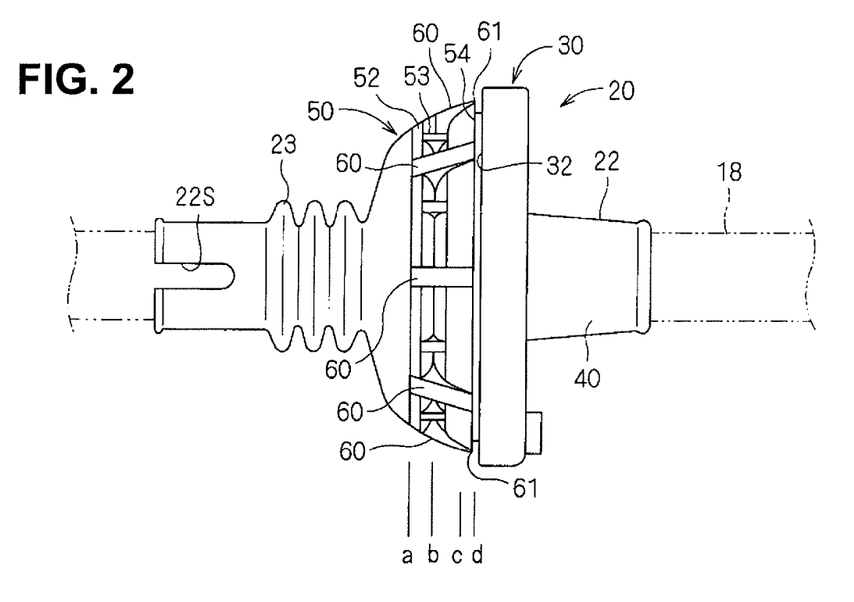
FIG. 2 is a side view of a wire harness with a grommet.
Figure 3:
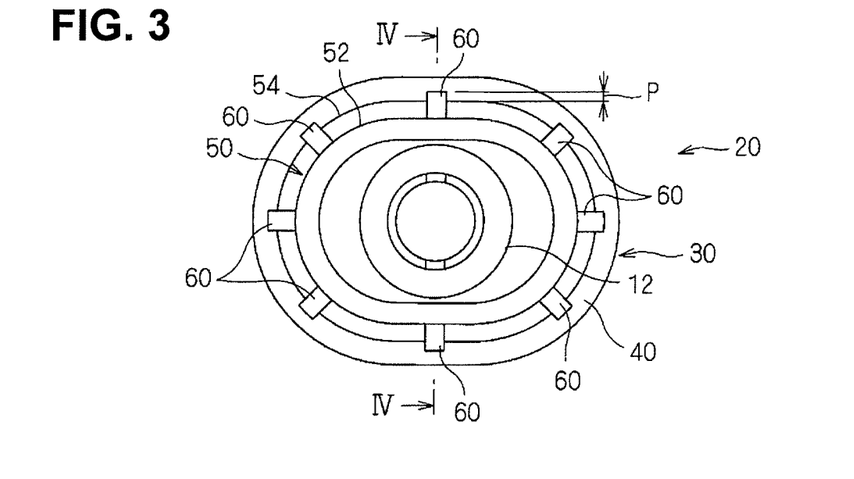
FIG. 3 is a plan view of the grommet.
Figure 4:
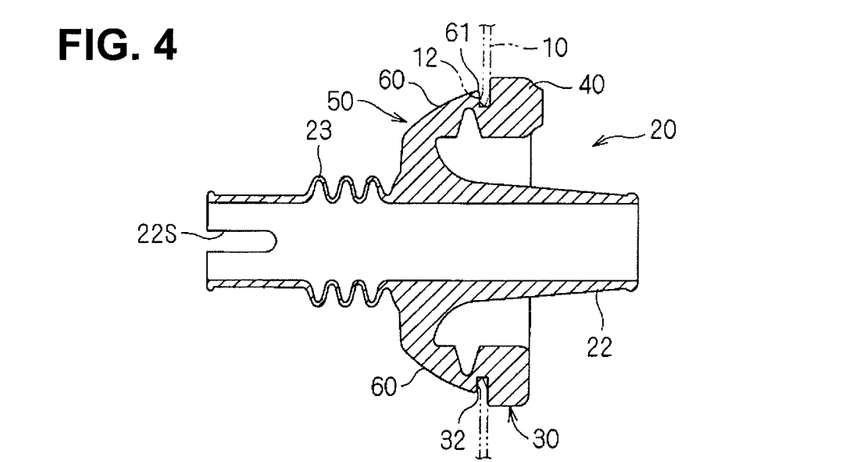
FIG. 4 is a cross-sectional view taken along line IV-IV shown in FIG. 3.
Figure 5:
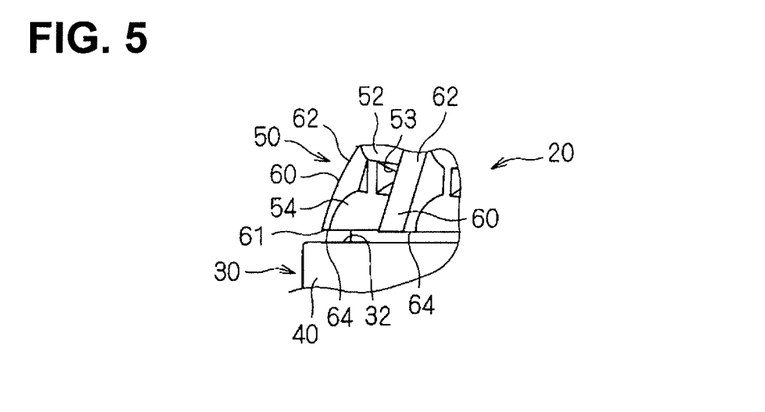
FIG. 5 is an enlarged view of a portion of FIG. 2.
Figure 6:
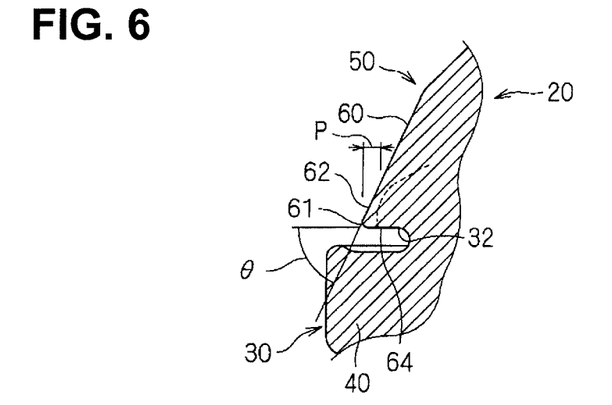
FIG. 6 is an enlarged view of a portion of FIG. 4.

Hereinafter, a grommet and a wire harness with a grommet according to an embodiment will be described. FIG. 1 is a perspective view of a grommet 20, FIG. 2 is a side view of a wire harness with the grommet, FIG. 3 is a plan view of the grommet 20, FIG. 4 is a cross-sectional view taken along line IV-IV shown in FIG. 3, FIG. 5 is an enlarged view of a portion of FIG. 2, and FIG. 6 is an enlarged view of a portion of FIG. 4.

The grommet 20 is attached to a through hole 12 formed in a vehicle body panel 10 in a state where the grommet 20 has been attached to a wire harness 18.

Here, the vehicle body panel 10 is a plate-shaped member that partitions a space in a vehicle. The vehicle body panel 10 is assumed to be, for example, a panel for delimiting a compartment from an engine room. The vehicle body panel 10 is provided with the through hole 12. Here, the through hole 12 has an oval shape, but may also be a hole having another shape such as a circular shape or a polygonal shape. The inner circumferential edge portion of the through hole 12 is inclined toward one main surface side of the vehicle body panel 10. Processing an inner circumferential edge portion of a hole so as to rise in this manner is called "burring". However, burring does not necessarily need to be performed on the inner circumferential edge portion of the through hole 12.

The wire harness 18 includes a plurality of electric wires that are bundled together. The wire harness 18 is arranged to pass through the through hole 12 and thus is used as a wiring for electrically connecting electric devices that are respectively disposed in two spaces partitioned by the vehicle body panel 10.

The grommet 20 is a member that is overall formed of an elastic material such as an elastomer (e.g., rubber), and includes a wire harness insertion portion 22 and an annular projecting portion 30. When the entire grommet 20 is formed of an elastic material such as an elastomer (e.g., rubber), there are advantages that it is possible to reduce the number of parts and assembly man-hours.

The wire harness insertion portion 22 is formed in a tubular shape through which the wire harness 18 can be inserted. The inner diameter of the wire harness insertion portion 22 is preferably set to be smaller than the outer diameter of the wire harness 18. Thereby, the wire harness 18 is inserted through the wire harness insertion portion 22 in a state where the wire harness insertion portion 22 is elastically deformed so as to be enlarged, then the wire harness insertion portion 22 elastically contracts, and thus the wire harness insertion portion 22 is fastened and fixed to the wire harness 18.

Moreover, the other end portion of the wire harness insertion portion 22 is formed in a tubular shape in which the thickness is gradually reduced toward its front end. The other end portion of the wire harness insertion portion 22 is provided with a pair of slits 22S extending in the axial direction. An adhesive tape is wound around the vicinity of the portion of the wire harness insertion portion 22 that is provided with the slits 22S in a state where the wire harness is inserted through the wire harness insertion portion 22, and thus the wire harness is fixed and positioned more reliably with respect to the wire harness insertion portion 22.

Moreover, a portion between the other end portion and an intermediate portion of the wire harness insertion portion 22 is formed into a bellows portion 23 in which large-diameter portions and small-diameter portions are alternately arranged. Thereby, it is easy to bend the other end portion of the wire harness insertion portion 22 with respect to the intermediate portion of the wire harness insertion portion 22, that is, a portion that is provided with the annular projecting portion 30 as described later.

The intermediate portion in the longitudinal direction of the wire harness insertion portion 22 is provided with the annular projecting portion 30. In other words, the wire harness insertion portion 22 projects from both surface sides of the annular projecting portion 30. However, the wire harness insertion portion 22 does not necessarily need to project from both surface sides of the annular projecting portion 30.

The annular projecting portion 30 is overall formed in a shape that projects outward from the outer circumference of the wire harness insertion portion 22 while being gradually enlarged from an intermediate portion in the longitudinal direction of the wire harness insertion portion 22 toward its one end portion. Here, the annular projecting portion 30 is formed in an oval shape as viewed in the axial direction of the wire harness insertion portion 22. The annular projecting portion 30 may also be formed in another shape such as a circular shape or a polygonal shape corresponding to the shape of the through hole 12.

Here, the largest annular portion of the annular projecting portion 30 is spaced apart from the outer circumferential portion of the wire harness insertion portion 22, but may also be connected to the wire harness insertion portion 22 via an annular plate portion or the like.

The outer circumferential portion of the annular projecting portion 30 is provided with an annular locking recess 32 to which the inner circumferential edge portion of the through hole 12 of the vehicle body panel 10 can be fitted. More specifically, the annular locking recess 32 to which the inner circumferential edge portion of the through hole 12 can be fitted is formed by providing an annular groove on the entire outer circumferential portion of the largest annular portion having an oval shape in the annular projecting portion 30. It is preferable that the width dimension of the annular projecting portion 30 in the axial direction of the wire harness insertion portion 22 is equal to or greater (slightly greater to the extent that the annular projecting portion 30 can be fitted without rattling) than the thickness of the vehicle body panel 10.

The annular projecting portion 30 is provided with a receiving-side annular portion 40 formed on one side of the annular locking recess 32 with respect to the axial direction of the wire harness insertion portion 22, and an insertion-side annular portion 50 formed on the other side of the annular locking recess 32 with respect to the axial direction of the wire harness insertion portion 22.

The receiving-side annular portion 40 is formed as an annular portion that is larger (slightly larger) than the through hole 12, and is configured to be capable of abutting against the other main surface of the vehicle body panel 10 at the entire peripheral portion of the through hole 12. It is preferable that the receiving-side annular portion 40 is set to have a size with which it cannot easily pass through the through hole 12 even when being elastically deformed.

The insertion-side annular portion 50 is overall formed in a shape in which the diameter gradually increases toward one end of the wire harness insertion portion 22 from the intermediate portion in the longitudinal direction of the wire harness insertion portion 22.

More specifically, the insertion-side annular portion 50 is formed in a shape in which a plurality of (here, two) annular projections 52 and 54 are connected to each other via an annular recess 53.

A portion of the smallest annular projection 52 that is located on the far side with respect to the annular locking recess 32 is formed into a shape that steeply falls toward the wire harness insertion portion 22. Moreover, a portion of the annular projection 52 that is located on the near side with respect to the annular locking recess 32 is formed into a shape that is recessed toward the wire harness insertion portion 22 while being curved so as to have a curved surface projecting outward.

A portion of the largest annular projection 54 that is located on the far side with respect to the annular locking recess 32 is formed into a shape that is recessed toward the wire harness insertion portion 22 while being curved so as to have a curved surface projecting outward. Thereby, the annular recess 53 having a V-shape is formed between the annular projections 52 and 54. Moreover, a portion of the annular projection 54 that is located on the side of the annular locking recess 32 is formed into a surface that falls at a right angle with respect to the axial direction of the wire harness insertion portion 22. The annular locking recess 32 is formed between this surface and the above-described receiving-side annular portion 40. It is preferable that the largest annular projection 54 is set to have a size with which it can pass through the through hole 12 when a relatively large force is applied thereto to elastically deform it.

The insertion-side annular portion 50 can be easily bent to narrow the annular recess 53.

Moreover, a portion of the insertion-side annular portion 50 that is located on the side of annular locking recess 32, that is, the outer circumferential portion of the largest annular projection 54 is provided with projections 60 that are partially formed in the circumferential direction.

Here, the projections 60 are provided at eight positions in total, that is, on the outer circumferential portion having an oval shape of the insertion-side annular portion 50, two positions through which the long axis passes, two positions through which the short axis passes, and four positions between them.

Here, each of the projections 60 extends from the smallest annular projection 52 to the largest annular projection 54, that is, formed in a shape of an elongate projection in the axial direction of the wire harness insertion portion 22 on the outer circumferential portion of the insertion-side annular portion 50.

The projections 60 fill the annular recess 53 between the annular projections 52 and 54. Thereby, it is possible to somewhat keep the insertion-side annular portion 50 from extending, regardless of the presence of the annular projections 52 and 54 and the annular recess 53 therebetween.

The projections 60 each include a slant surface 62 and a panel facing surface 64 (see FIG. 5 and FIG. 6).

The slant surface 62 is formed as a surface that inclines outward while extending toward the annular locking recess 32 in the axial direction of the wire harness insertion portion 22. Here, of the outward surface of the projections 60, the entire portion extending from a portion that comes into contact with the through hole 12 when the insertion-side annular portion 50 is inserted into the through hole 12 (see FIG. 10) to the panel facing surface 64, that is, the annular locking recess 32, is formed as a slant surface 62, which inclines at a uniform angle with respect to the axial direction of the wire harness insertion portion 22. However, the outward surface of the projections 60 does not necessarily need to incline at a uniform angle. Moreover, the outward surface of the projections 60 may incline while being curved.

Moreover, the panel facing surface 64 is a surface facing the annular locking recess 32, and defines an acute angle θ (see FIG. 6) together with the slant surface 62.

Furthermore, a corner portion 61 of the projections 60 in which the slant surface 62 and the panel facing surface 64 intersect projects further outward than the outer circumferential portion of the annular locking recess 32 of the insertion-side annular portion 50 (see P in FIG. 3 and FIG. 6). Accordingly, when the insertion-side annular portion 50 is viewed in the axial direction of the wire harness insertion portion 22, it can be observed that the plurality of projections 60 project from the outer circumferential portion of the insertion-side annular portion 50.

Moreover, at least a portion of the projections 60 that is on the side of the annular locking recess 32 has a rectangular cross-sectional shape in the direction orthogonal to the longitudinal direction. In other words, the projections 60 project in a rectangular shape from the insertion-side annular portion 50 as viewed in the axial direction of the wire harness insertion portion 22. Here, the projections 60 have, over their entire longitudinal direction, a rectangular cross-sectional shape in the direction orthogonal to the longitudinal direction of the projections 60.

It should be noted that an inner portion of the annular recess 53 is provided with small connecting portions 54 that are formed at some portions along the direction in which the annular recess 53 extends. Here, the small connecting portions 54 are formed between the projections 60 around the annular recess 53. The small connecting portions 54 also play a role in somewhat keeping the insertion-side annular portion 50 from extending. The small connecting portions 54 may also be omitted.

An operation of attaching the above-described grommet 20 to the through hole 12 of the vehicle body panel 10 will be described next.

First, a grommet 20 that has been attached to a wire harness 18 is prepared.

Next, a portion of the wire harness 18 that extends from the insertion-side annular portion 50 is inserted through the through hole 12, and then the insertion-side annular portion 50 of the grommet 20 is pushed into the through hole 12.

Figure 10:
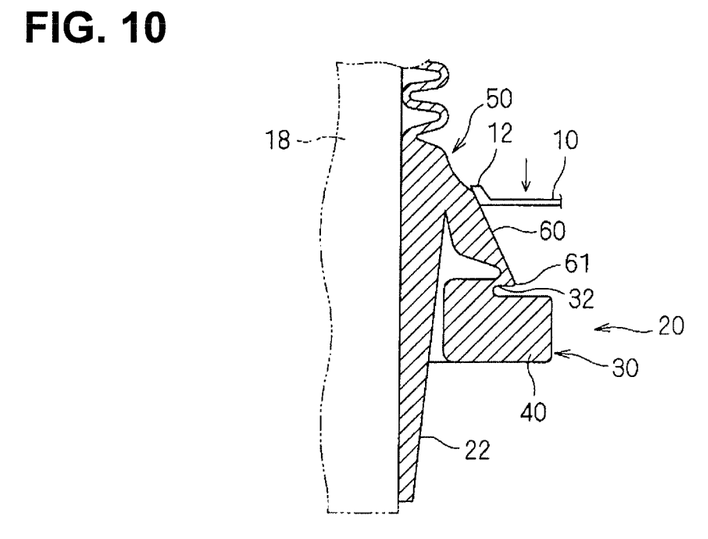
FIG. 10 is a drawing illustrating an operation of attaching the grommet.

As a result, first, the inner circumferential edge portion of the through hole 12 starts to abut against the slant surfaces 62 of the projections 60 (see position a in FIG. 2, and FIG. 10).

Figure 7:
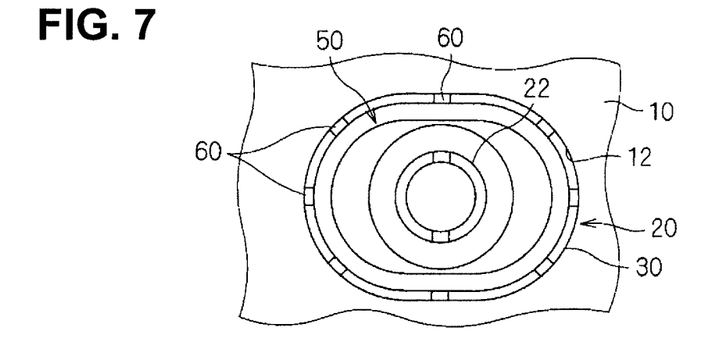
FIG. 7 is a drawing illustrating an operation of attaching the grommet.

When the insertion-side annular portion 50 is further pushed thereinto, the inner circumferential edge portion of the through hole 12 pushes the projections 60 to the inside of the insertion-side annular portion 50. Thereby, the insertion-side annular portion 50 is deformed so as to reduce its diameter (see position b in FIG. 2, and FIG. 7).

Figure 8:
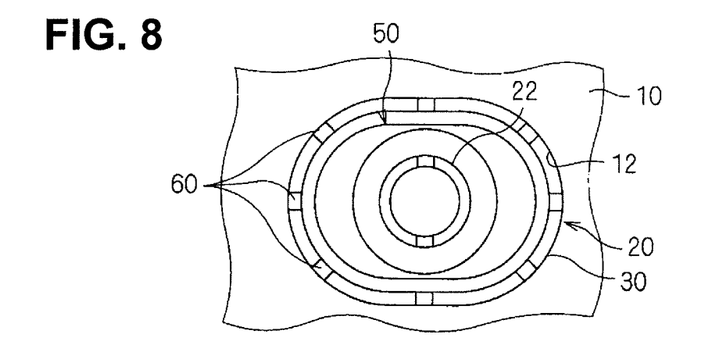
FIG. 8 is a drawing illustrating an operation of attaching the grommet.

When the insertion-side annular portion 50 is a little further pushed thereinto, the inner circumferential edge portion of the through hole 12 further pushes the projections 60 to the inside of the insertion-side annular portion 50, and the insertion-side annular portion 50 is further deformed so as to reduce its diameter (see position c in FIG. 2, and FIG. 8).

Figure 11:
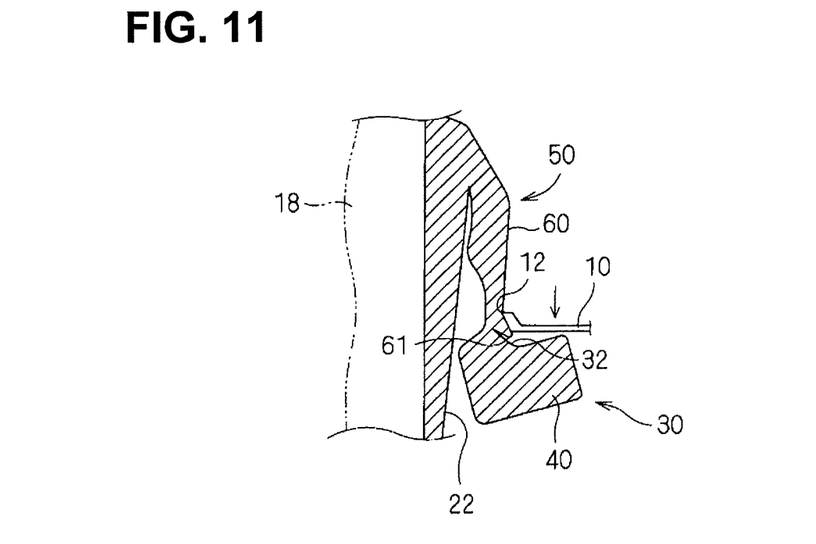
FIG. 11 is a drawing illustrating an operation of attaching the grommet.
Figure 12:
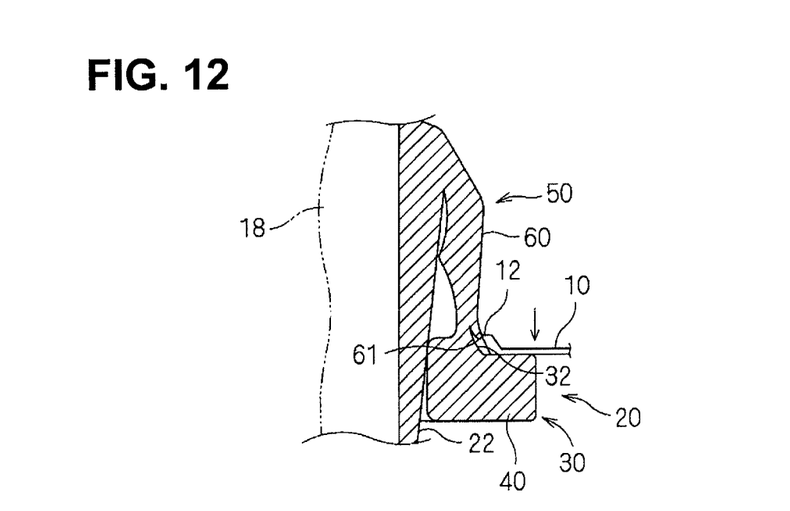
FIG. 12 is a drawing illustrating an operation of attaching the grommet.

In a state right before the inner circumferential edge portion of the through hole 12 is locked to the annular locking recess 32, as shown in FIG. 11 and FIG. 12, the corner portions 61 of the projections 60 are strongly pushed toward the inner portion of the annular locking recess 32 while elastically deforming the peripheral portions.

Figure 13:
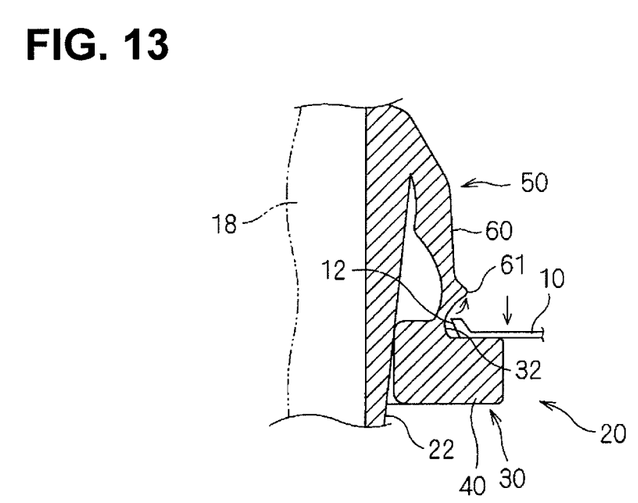
FIG. 13 is a drawing illustrating an operation of attaching the grommet.

When the insertion-side annular portion 50 is further pushed thereinto, lastly, the inner circumferential edge portion of the through hole 12 is locked to the annular locking recess 32 (see position d in FIG. 2). In this situation, since the corner portion 61 of the projections 60 has an acute angle, as shown in FIG. 13, a force acting from the inner circumferential edge portion of the through hole 12 that pushes the corner portions 61 of the projections 60 toward the inner portion of the annular locking recess 32 is released at one time, and thus the corner portions 61 of the projections 60 are snapped back to their original shape by their elastic restoration forces. A sound is likely to be made when the projections 60 snap back to their original shape in this manner, and therefore, an operator who performs an operation of attaching the grommet 20 can confirm whether or not the grommet is completely inserted by hearing that sound. Also, when the projections 60 snap back to their original shape, the operator can feel the impact as an insertion feeling. From this viewpoint as well, it is easy to confirm whether or not the inner circumferential edge portion of the through hole 12 of the vehicle body panel 10 is fitted to the annular locking recess 32.

Figure 9:
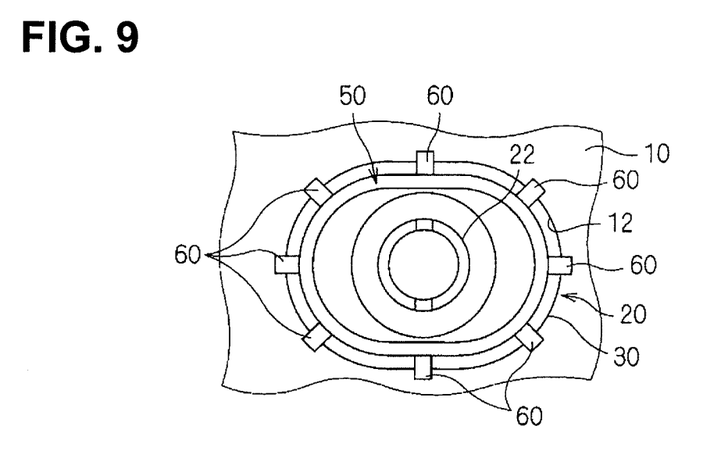
FIG. 9 is a drawing illustrating an operation of attaching the grommet.

Moreover, if all of the projections 60 pass over the annular locking recess 32 in a state after the grommet 20 is attached to the through hole 12 of the vehicle body panel 10 as described above, it can be observed that the projections 60 project from predetermined positions on the outer circumferential portion of the insertion-side annular portion 50 of the grommet 20 (here, eight positions around the outer circumference) as shown in FIG. 9. From this viewpoint as well, it is possible to more reliably confirm whether or not the grommet 20 is completely attached to the through hole 12 of the vehicle body panel 10.

From this viewpoint, it is conceivable that it is possible to more reliably confirm whether or not the grommet is completely attached if the projections are provided at regular intervals on three or more positions around the through hole and the insertion-side annular portion. In particular, when a grommet is assumed to be the type of grommet in which the through hole 12 and the insertion-side annular portion 50 have an oval shape in the same manner as in this embodiment, it is conceivable that it is possible to more reliably confirm whether or not the grommet 20 is completely attached if the projections are provided at equal to or greater than four positions through which the long axis and the short axis pass.

Moreover, with the above-described embodiment, the insertion-side annular portion 50 is formed in a shape in which a plurality of annular projections 52 and 54 are connected to each other via the annular recess 53, and therefore, the insertion-side annular portion 50 can be bent to some extent with respect to the vehicle body panel 10. Thereby, it is possible to enhance a degree of freedom of the direction in which the wire harness 18 is drawn. On this premise, the projections 60 are formed on the side of the outer circumference of the insertion-side annular portion 50 in a shape of an elongate projection that extends in the axial direction of the wire harness insertion portion 22 while filling the annular recess 53, and therefore, when the grommet 20 is inserted into the through hole 12, the projections 60 can reinforce the insertion-side annular portion 50 so as not to be likely to extend and enhance the insertion property.

Moreover, the slant surfaces 62 of the projections 60 incline at a uniform angle with respect to the axial direction of the wire harness insertion portion 22, and therefore, when the insertion-side annular portion 50 of the grommet 20 is inserted into the through hole 12, it is possible to bring the projections 60 into contact with the inner circumferential edge portion of the through hole 12 in a substantially uniform manner. Thereby, it is possible to stabilize the insertion feeling of the insertion-side annular portion 50. Also, it is thereby possible to emphasize the insertion feeling when the projections 60 pass over the inner circumferential edge portion of the through hole 12 and is elastically restored as if to jump up.

Moreover, the projections 60 project in a rectangular shape from the insertion-side annular portion 50 as viewed in the axial direction of the wire harness insertion portion 22, and therefore, a large energy is likely to be stored when the inner circumferential edge portion of the through hole 12 presses the projections 60. Therefore, a larger sound is likely to be made when the projections 60 are elastically restored as if to jump up, and it is possible to feel the great insertion feeling. Thereby, it is possible to more reliably confirm whether or not the inner circumferential edge portion of the through hole 12 of the vehicle body panel 10 is fitted to the annular locking recess 32 of the grommet 20.

However, the projections 60 may also project in a triangular shape, semicircular shape, or the like.

Having described the present invention in detail, the foregoing description is illustrative in all aspects and the present invention is not limited thereto. It is understood that countless variants not illustrated herein are conceivable without deviating from the scope of the present invention.

LIST OF REFERENCE NUMERALS

10 Vehicle body panel
12 Through hole
18 Wire harness
20 Grommet
22 Wire harness insertion portion
32 Annular locking recess
40 Receiving-side annular portion
50 Insertion-side annular portion
52, 54 Annular projection
53 Annular recess
60 Projection
61 Corner portion
62 Slant surface
64 Panel facing surface

The invention claimed is:

1. A grommet that is attachable to a through hole formed in a vehicle body panel in a condition in which the grommet has been attached to a wire harness, the grommet comprising:
a wire harness insertion portion having a tubular shape through which the wire harness is insertable; and
an annular projecting portion that is made of an elastic material and projects outward from the wire harness insertion portion, the annular projecting portion including:
an annular locking recess to which an inner circumferential edge portion of the through hole in the vehicle body panel can be fitted, the annular locking recess being arranged at an outer circumferential portion of the annular projecting portion,
a receiving-side annular portion arranged on one side of the annular locking recess, with respect to an axial direction of the wire harness insertion portion, and
an insertion-side annular portion arranged on the other side of the annular locking recess, with respect to the axial direction of the wire harness insertion portion,
wherein the outer circumferential portion of the insertion-side annular portion on the annular locking recess side includes projections that are formed at portions in the circumferential direction of the insertion-side annular portion,
the projections each include a slant surface that inclines outward as it extends toward the annular locking recess in the axial direction of the wire harness insertion portion and a panel facing surface that defines an acute angle together with the slant surface and faces the annular locking recess,
an inner circumferential portion of the insertion-side annular portion includes a recess that is recessed toward the outer circumferential portion of the insertion side annular portion and reduces the thickness of a portion of the projections that is located on the other side of the panel facing surface, with respect to the axial direction of the wire harness insertion portion,
wherein the insertion-side annular portion is formed in a shape in which a plurality of annular projections that successively become larger toward the annular locking recess are connected to each other via an annular recess, and
the projections are each formed on an outer circumference of the insertion-side annular portion in a shape of an elongate projection that extends in the axial direction of the wire harness insertion portion while filling the annular recess.

2. The grommet according to claim 1,
wherein a portion of the projection that extends from a portion that comes into contact with the through hole when the insertion-side annular portion is inserted into the through hole to a portion in which the slant surface reaches the panel facing surface inclines at a uniform angle with respect to the axial direction of the wire harness insertion portion.

3. The grommet according to claim 1,
wherein the projection projects in a rectangular shape from the insertion-side annular portion as viewed in the axial direction of the wire harness insertion portion.

4. The grommet according to claim 1,
wherein at least three projections are provided at intervals around the insertion-side annular portion.

5. A wire harness with a grommet comprising:
a wire harness to be arranged to pass through a through hole formed in a panel; and
the grommet according to claim 1 that is attached to the wire harness.

* * * * *